UNITED STATES PATENT OFFICE.

ANTHONY J. HINDERMEYER, OF PHILADELPHIA, PENNSYLVANIA, ASSIGNOR TO MARY A. HUNTER AND MARIA W. HUNTER, OF SAME PLACE.

PROCESS OF CONVERTING MALLEABLE IRON INTO STEEL.

SPECIFICATION forming part of Letters Patent No. 492,679, dated February 28, 1893.

Application filed June 15, 1892. Serial No. 436,812. (No specimens.)

*To all whom it may concern:*

Be it known that I, ANTHONY J. HINDERMEYER, a citizen of the United States, residing in the city and county of Philadelphia, State of Pennsylvania, have invented a new and useful Improvement in the Process of Converting Malleable Iron into Steel, which improvement is fully set forth in the following specification.

In carrying out my invention, I take—ten parts of plumbago, and one part of salt, and combine them with sufficient sulphuric acid to make a plastic mass or paste. The mass is placed in a crucible into which malleable iron is packed, and the crucible is sealed and subjected to a high degree of heat, the result being the conversion of the iron into steel, in an effective manner, the steel being of a superior order.

Having thus described my invention, what I claim as new, and desire to secure by Letters Patent, is—

A composition of matter consisting of plumbago, salt and sulphuric acid, substantially as and for the purpose set forth.

ANTHONY J. HINDERMEYER.

Witnesses:
JOHN A. WIEDERSHEIM,
A. P. JENNINGS.